US012646937B2

(12) United States Patent
Chuang

(10) Patent No.: US 12,646,937 B2
(45) Date of Patent: Jun. 2, 2026

(54) POWER SUPPLY SYSTEM AND POWER SUPPLY METHOD

(71) Applicant: ALPHA NETWORKS INC., Hsinchu (TW)

(72) Inventor: Kun-Neng Chuang, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 0 days.

(21) Appl. No.: 18/815,262

(22) Filed: Aug. 26, 2024

(65) Prior Publication Data

US 2025/0293515 A1     Sep. 18, 2025

(30) Foreign Application Priority Data

Mar. 12, 2024    (TW) ................................. 113108984

(51) Int. Cl.
*H02J 1/10*          (2006.01)

(52) U.S. Cl.
CPC .................................... *H02J 1/106* (2020.01)

(58) Field of Classification Search
CPC ...................................................... H02J 1/106
See application file for complete search history.

(56) References Cited

U.S. PATENT DOCUMENTS 7,615,875 B1 * 11/2009 Henneberg ............ H01M 12/06
                                                                    290/1 A
7,679,208 B1 *  3/2010 Ko ........................ F03D 7/0224
                                                                    290/55

| | | | |
|---|---|---|---|
| 7,696,642 B2 * | 4/2010 | Wakitani | H02J 1/10 |
| | | | 307/65 |
| 7,939,970 B1 * | 5/2011 | Walling | F03D 7/0284 |
| | | | 290/44 |
| 8,384,244 B2 * | 2/2013 | Peterson | G06F 1/30 |
| | | | 307/64 |
| 10,907,603 B2 * | 2/2021 | Caballero Atienzar ... | H02J 7/34 |
| 2014/0360553 A1 * | 12/2014 | Yoshidomi | H10F 77/955 |
| | | | 136/244 |
| 2017/0324241 A1 * | 11/2017 | Lee | G08C 19/02 |
| 2018/0287393 A1 * | 10/2018 | Maedako | H02P 9/02 |
| 2022/0069616 A1 * | 3/2022 | Nakamori | H02J 9/062 |
| 2022/0231530 A1 * | 7/2022 | Mori | H02J 7/0063 |

* cited by examiner

*Primary Examiner* — Daniel C Puentes
*Assistant Examiner* — Esayas G Yeshaw
(74) *Attorney, Agent, or Firm* — Birch, Stewart, Kolasch & Birch, LLP

(57)                    ABSTRACT

A power supply system is adapted to supply a power to a load, is connected to a load sharing bus, and includes two power supply devices and a control device. The two power supply devices are connected in parallel to the load, respectively have a maximum power, and respectively output an output power to the load. The control device is electrically connected to the two power supply devices. When a controlling condition is met, one of the two power supply devices with the greatest maximum power adjusts the output power according to a controlling signal from the control device and a sharing signal from the load sharing bus, so that the two output powers of the two power supply devices are the same or similar.

8 Claims, 5 Drawing Sheets

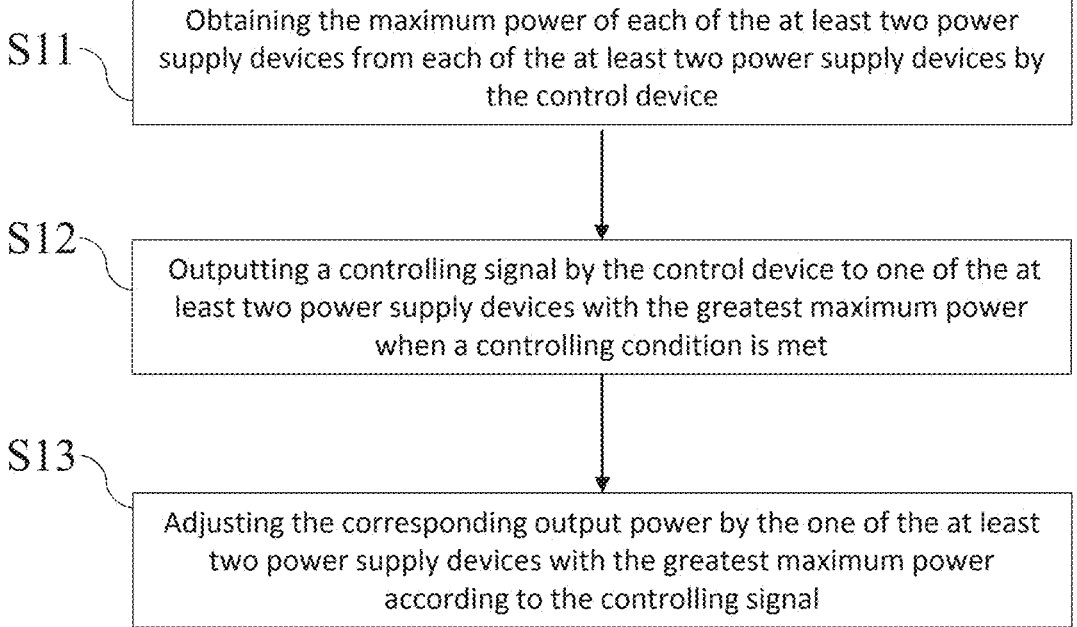

S11 — Obtaining the maximum power of each of the at least two power supply devices from each of the at least two power supply devices by the control device S12 — Outputting a controlling signal by the control device to one of the at least two power supply devices with the greatest maximum power when a controlling condition is met S13 — Adjusting the corresponding output power by the one of the at least two power supply devices with the greatest maximum power according to the controlling signal

FIG.4

POWER SUPPLY SYSTEM AND POWER SUPPLY METHOD

BACKGROUND OF THE INVENTION

Technical Field

The present invention relates generally to a power supply system, and more particularly to a power supply system, which has at least two power supply devices for power supply, and a power supply method.

Description of Related Art

It is known that in order to provide a backup power source or raise a total output power of a conventional power supply system, the conventional power supply system is provided with at least two power supply devices which are connected in parallel and could cooperate in power supply. In other words, the at least two power supply devices could operate at the same time, thereby raising the total output power of the conventional power supply system.

In order to raise the total output power of the conventional power supply system, the at least two power supply devices are electrically connected to a load sharing bus, so that each of the at least two power supply devices could output an output power according to a sharing signal of the load sharing bus, thereby achieving a purpose of maintaining a stable power supply of each of the at least two power supply devices.

As at least two scales of at least two maximum powers of the at least two power supply devices are the same and the at least two power supply devices correspond to the same sharing signal, the at least two output powers of the at least two power supply devices would be the same. However, as the at least two scales of the at least two maximum powers of the at least two power supply devices are different and the at least two power supply devices correspond to the same sharing signal, the at least two power supply devices would respectively output the output power in the same proportion according to the maximum power of each of the at least two power supply devices. In other words, one of the at least two power supply devices with the greatest maximum power outputs the greater output power and one of the at least two power supply devices with the less maximum power outputs the less output power.

For example, a power supply system has at least two power supply devices including a first power supply device and a second power supply device, wherein a maximum power of the first power supply device is 1200 W and a maximum power of the second power supply device is 2000 W.

Under the condition of the same sharing signal, when an electric power demand of a load is 320 W, an output power of the first power supply device is 10% of the maximum power (1200 W) of the first power supply device, namely 120 W; an output power of the second power supply device is 10% of the maximum power (2000 W) of the second power supply device, namely 200 W, so that a total output power of the first power supply device and the second power supply device is 320 W which could satisfy the electric power demand of the load.

Under the condition of the same sharing signal, when the electric power demand of the load is 1600 W, the output power of the first power supply device is 50% of the maximum power (1200 W) of the first power supply device, namely 600 W; the output power of the second power supply device is 50% of the maximum power (2000 W) of the second power supply device, namely 1000 W, so that the total output power of the first power supply device and the second power supply device is 1600 W.

In other words, the output power of the second power supply device is always greater than the output power of the first power supply device. As a result, a useful life of one of the power supply devices with the greatest maximum power (the second power supply device) would be reduced during a long-term usage and a problem of a reliability of the power supply system would be generated.

Additionally, based on safety regulations, when an input voltage of each of the power supply devices meets a low line, namely the input voltage of each of the power supply devices is from AC90V to AC120V, the output power of each of the power supply devices could not be greater than a limit value (such as 1000 W) of the output power of each of the power supply devices. In other words, even if the maximum power of each of the power supply devices is greater than 1000 W, the maximum power of each of the power supply devices is limited at the low line to be 1000 W. As a result, the output power of each of power supply devices could not be greater than 1000 W.

When the electric power demand of the load is 320 W, the output power of the first power supply device is 120 W and the output power of the second power supply device is 200 W, so that the total output power of the first power supply device and the second power supply device is 320 W which could satisfy the electric power demand of the load.

When the electric power demand of the load is 1600 W, the output power of the first power supply device is 600 W and the output power of the second power supply device is 1000 W, so that the total output power of the first power supply device and the second power supply device is 1600 W. At that time, the output power of the second power supply device has met an upper limit of the safety regulations, but the electric power demand of the load could still be satisfied.

However, when the electric power demand of the load is greater than 1600 W, the power supply system could not supply the sufficient electric power. It is because the output power of the second power supply device has met the upper limit of the safety regulations. Even if a sum of the maximum power of the first power supply device and the maximum power of the second power supply device is still greater than 1600 W, the total output power could not be increased due to the input voltage meeting the low line. As a result, the total output power of the power supply system is limited.

BRIEF SUMMARY OF THE INVENTION

In view of the above, the primary objective of the present invention is to provide a power supply system and a power supply method, thereby reducing an output power of one of a plurality of power supply devices with the greatest maximum power.

The present invention provides a power supply system adapted to supply a power to a load and connected to a load sharing bus. The power supply system includes at least two power supply devices and a control device, wherein the at least two power supply devices are connected in parallel to the load. Each of the at least two power supply devices has a maximum power and outputs an output power to the load. The output power of each of the at least two power supply devices is less than or equal to the maximum power of each of the at least two power supply devices. Each of the at least two power supply devices receives a sharing signal from the load sharing bus and adjusts the output power of each of the at least two power supply devices according to the sharing signal. The control device is electrically connected to the at least two power supply devices, wherein the control device obtains the maximum power of each of the at least two power supply devices from each of the at least two power supply devices. When a controlling condition is met, the control device outputs a controlling signal to one of the at least two power supply devices with the greatest maximum power and the one of the at least two power supply devices with the greatest maximum power accordingly adjusts the corresponding output power, so that the at least two output powers of the at least two power supply devices are the same or similar; wherein the controlling condition includes that the maximum power of the one of the at least two power supply devices with the greatest maximum power is greater than a predetermined maximum power and is greater than the maximum power of another one of the at least two power supply devices.

The present invention further provides a power supply method applied to the power supply system, wherein the power supply system includes the at least two power supply devices and the control device. The at least two power supply devices are connected in parallel to the load. Each of the at least two power supply devices has the maximum power and outputs the output power to the load. The output power is less than or equal to the maximum power. Each of the at least two power supply devices receives the sharing signal from the load sharing bus and adjusts the corresponding output power according to the sharing signal. The power supply method includes the following steps: the control device obtains the maximum power of each of the at least two power supply devices from each of the at least two power supply devices; when the controlling condition is met, the control device outputs the controlling signal to the one of the at least two power supply devices with the greatest maximum power; the controlling condition includes: the maximum power of the one of the at least two power supply devices with the greatest maximum power is greater than the predetermined maximum power and is greater than the maximum power of another one of the at least two power supply devices; the one of the at least two power supply devices with the greatest maximum power adjusts the corresponding output power according to the controlling signal, so that the at least two output powers of the at least two power supply devices are the same or similar.

With the aforementioned design, through adjusting the output power of one of the at least two power supply devices with the greatest maximum power, the output powers of the at least two power supply devices of the power supply system could be the same or similar, thereby extending a useful life of the one of the at least two power supply devices with the greatest maximum power, enhancing a reliability of the power supply system, and maximizing a total of the at least two output powers of the at least two power supply devices.

Additionally, the at least two power supply devices are electrically connected to an AC power source. Each of the at least two power supply devices transmits an input voltage information corresponding to the AC power source to the control device. The controlling condition further includes the input voltage information of the one of the at least two power supply devices with the greatest maximum power meets a low line. In this way, with a premise of meeting the safety regulations, a total output power of the power supply system could be raised and the total of the output powers of the at least two power supply devices could be maximized.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 4 is a flow chart of the power supply method according to the first embodiment of the present invention.

DETAILED DESCRIPTION OF THE INVENTION

Figure 1:
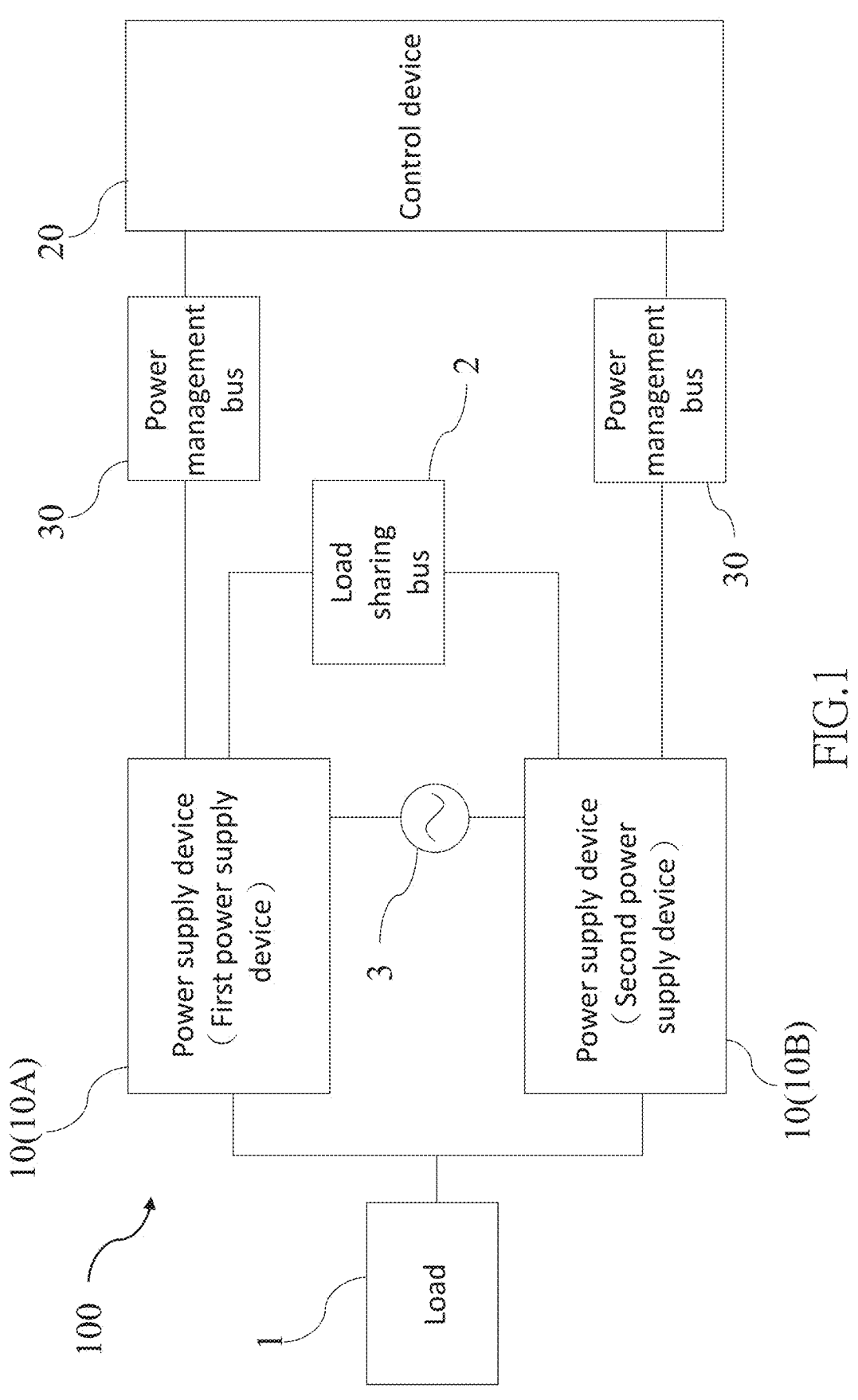
FIG. 1 is a schematic view of the power supply system according to a first embodiment of the present invention.
Figure 2:
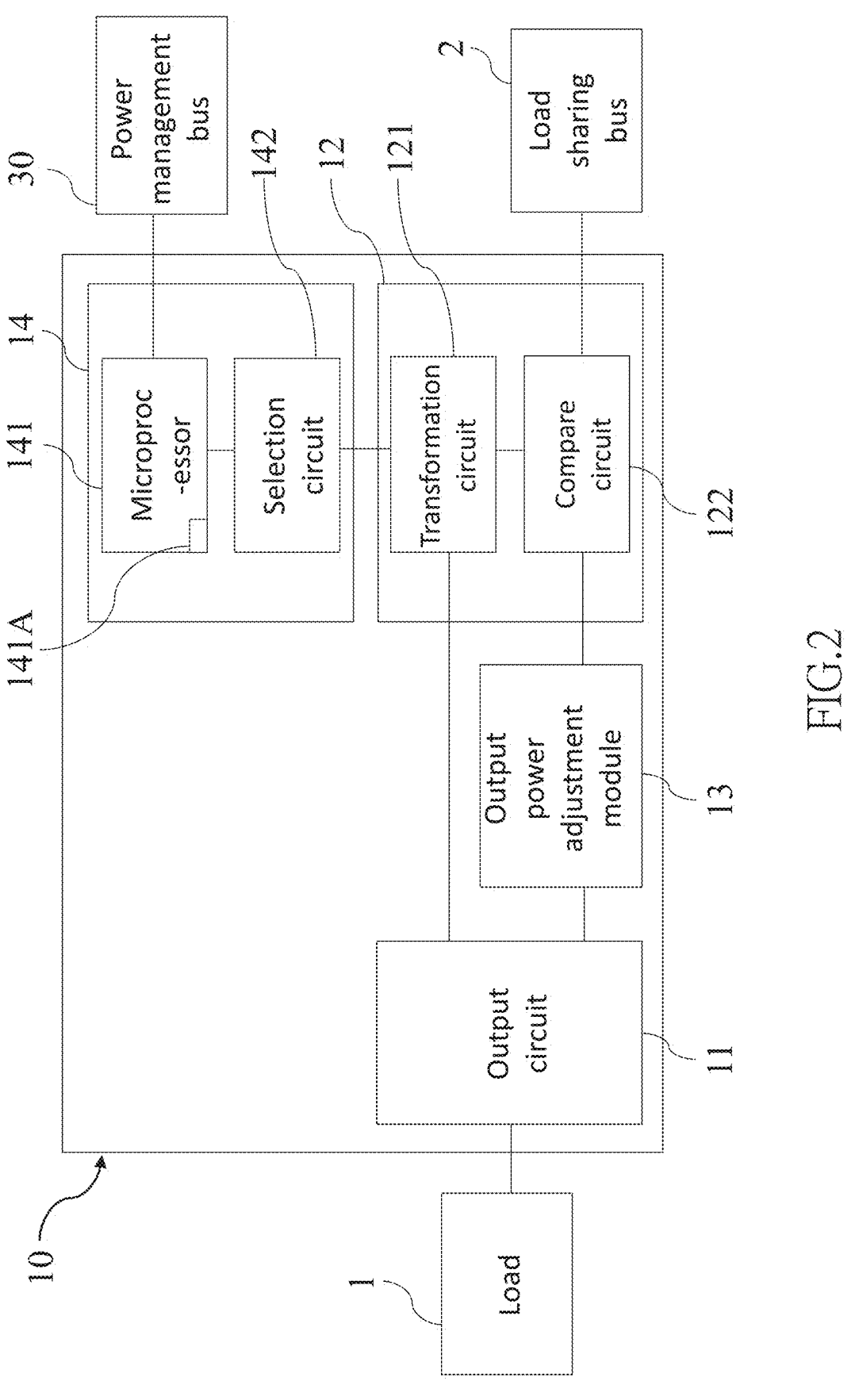
FIG. 2 is a schematic view of one of the at least two power supply devices according to the first embodiment of the present invention.
Figure 3:
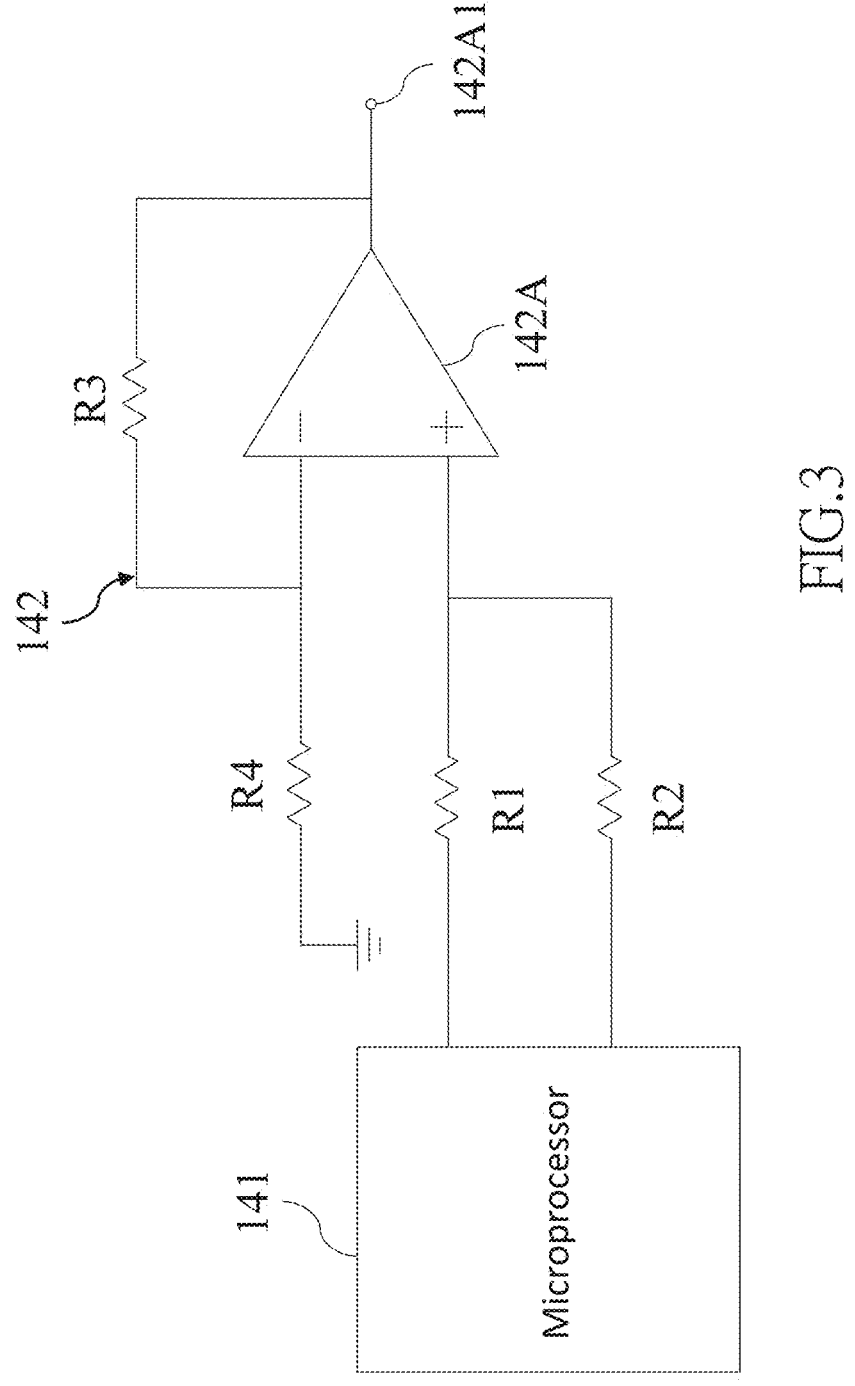
FIG. 3 is a circuit diagram of the selection circuit according to the first embodiment of the present invention.

A power supply system 100 according to a first embodiment of the present invention is illustrated in FIG. 1 to FIG. 3. The power supply system 100 is adapted to supply a power to a load 1 and is connected to a load sharing bus 2. The power supply system 100 includes at least two power supply devices 10 and a control device 20.

In the current embodiment, there are two power supply devices 10 as an example, but not limited thereto; the number of the at least two power supply devices 10 could be greater than or equal to three. The two power supply devices 10 include a first power supply device 10A and a second power supply device 10B. The two power supply devices 10 are electrically connected to an AC power source 3 and are connected in parallel to the load 1, thereby transforming an AC power to a DC power and supplying the DC power to the load 1. The AC power source 3 could meet a high line or a low line. The high line could be from AC180V to AC264V as an example. The low line could be from AC90V to AC120V as an example. Each of the two power supply devices 10 has a maximum power and could output an output power to the load 1. The maximum power of each of the two power supply devices 10 is the greatest rated output power of each of the two power supply devices 10. The output power of each of the two power supply devices 10 is less than or equal to the maximum power of each of the two power supply devices 10. In the current embodiment, each of the two power supply devices 10 is a power supply device outputting a constant voltage as an example, so that the maximum power of each of the two power supply devices 10 and the output power of each of the two power supply devices 10 depend on an output current of each of the two power supply devices 10. For example, when the AC power source 3 meets the high line, the maximum output current outputted by the power supply device 10 with the maximum power of 2000 W and the constant voltage of DC54.5V is 36.7 A; when the AC power source 3 meets the low line, the maximum power would be limited to 1000 W, so that the maximum output current which could be outputted by the power supply device 10 would be limited to 18.34 A. Each of the two power supply devices 10 receives a sharing signal from the load sharing bus 2 and correspondingly adjusts the output power according to the sharing signal. In the current embodiment, the sharing signal is a voltage signal and corresponds to the output power of each of the two power supply devices 10, e.g., corresponds to the output current of each of the two power supply devices 10.

The two power supply devices 10 are electrically connected to the control device 20. In the current embodiment, the two power supply devices 10 are respectively and electrically connected to the control device 20 through a communication interface, such as a power management bus 30 (PM Bus), to communicate with the control device 20.

A structure of one of the two power supply devices 10 is the same as a structure of the other power supply device 10. In the below description, one of the power supply devices 10 is illustrated as an example. The power supply device 10 includes an output circuit 11, a compare module 12, an output power adjustment module 13, and a signal processing module 14, wherein the output circuit 11 is electrically connected to the load 1, the compare module 12, and the output power adjustment module 13. The output circuit 11 supplies the output power to the load 1 and outputs a feedback signal corresponding to the output power outputted by the output circuit 11. In the current embodiment, the feedback signal is a voltage signal and corresponds to the output current outputted by the output circuit 11. The compare module 12 is electrically connected to the load sharing bus 2, the output circuit 11, and the output power adjustment module 13. The compare module 12 receives the feedback signal from the output circuit 11 and the sharing signal from the load sharing bus 2 and outputs an adjusting signal to the output power adjustment module 13 according to the sharing signal and the feedback signal. The output power adjustment module 13 adjusts the output power outputted by the output circuit 11 according to the adjusting signal, i.e., the output power adjustment module 13 adjusts the output current. The signal processing module 14 is electrically connected to the power management bus 30 and the compare module 12 and could be controlled by the control device 20 to selectively output a compensating signal to the compare module 12. The signal processing module 14 detects an input voltage information of the AC power source 3 and promptly detects the output power of the output circuit 11. In the current embodiment, the input voltage information could be a voltage value of the AC power source 3 as an example.

In the current embodiment, the signal processing module 14 includes a microprocessor 141 and a selection circuit 142 electrically connected to the microprocessor 141, wherein the microprocessor 141 is electrically connected to the power management bus 30 and stores a value of the maximum power of the power supply device 10, the input voltage information, and a real-time value of the output power. The value of the maximum power of the power supply device 10, the input voltage information, and the real-time value of the output power could be stored in a memory 141A of the signal processing module 14. The memory 141A could be built in the microprocessor 141 or be separate from the microprocessor 14. The microprocessor 141 controls the selection circuit 142 to generate the compensating signal. The selection circuit 142 could include a voltage adder circuit as an example. The selection circuit 142 is illustrated in FIG. 3 and is a non-inverting voltage adder circuit. The selection circuit 142 includes an operational amplifier 142A and a plurality of resistors R1~R4. An output terminal 142A1 of the operational amplifier 142A is electrically connected to the compare module 12. The resistors R1, R2 are electrically connected to the microprocessor 141.

The microprocessor 141 could output a first voltage to the resistor R1 and/or output a second voltage to the resistor R2. The first voltage corresponds to a resistance value of the resistor R1 and the second voltage corresponds to a resistance value of the resistor R2, so that the operational amplifier 142A transforms the first voltage and the second voltage into the compensating signal. Referring to FIG. 3, the compensating signal is a positive voltage signal and a voltage value of the compensating signal depends on the first voltage outputted by the microprocessor 141 and the second voltage outputted by the microprocessor 141 and the resistors R1, R2. When the signal processing module 14 does not need to output the compensating signal, the microprocessor 141 outputs 0 V to the resistors R1, R2, so that the output terminal 142A1 of the operational amplifier 142A is 0 V, i.e., the selection circuit 142 does not output the compensating signal.

Additionally, in the current embodiment, the compare module 12 includes a transformation circuit 121 and a compare circuit 122 electrically connected to the transformation circuit 121, wherein the transformation circuit 121 is electrically connected to the selection circuit 142 and the output circuit 11. The compare circuit 122 is electrically connected to the output power adjustment module 13 and the load sharing bus 2. When the selection circuit 142 does not output the compensating signal, i.e., the selection circuit 142 outputs 0 V, the transformation circuit 121 outputs the feedback signal to the compare circuit 122 and the compare circuit 122 outputs the adjusting signal according to the feedback signal and the sharing signal. When the selection circuit 142 outputs the compensating signal, the transformation circuit 121 receives the compensating signal and outputs a transforming signal to the compare circuit 122 according to the compensating signal and the feedback signal and the compare circuit 122 outputs the adjusting signal according to the transforming signal and the sharing signal.

For example, the transformation circuit 121 could be a voltage adder circuit. The transformation circuit 121 adds a voltage of the feedback signal to a voltage of the compensating signal outputted by the selection circuit 142 of the signal processing module 14. When the selection circuit 142 outputs 0 V, a voltage outputted by the transformation circuit 121 is equal to the voltage of the feedback signal, so that the transformation circuit 121 could output the feedback signal to the compare circuit 122. The compare circuit 122 could be a comparator circuit as an example. The compare circuit 122 compares the voltage of the feedback signal with a voltage of the sharing signal and accordingly outputs the adjusting signal to adjust the output power. When the output power is stable, the voltage of the feedback signal is equal to the voltage of the sharing signal.

When the selection circuit 142 of the signal processing module 14 outputs the compensating signal, a voltage of the transforming signal outputted by the transformation circuit 121 is a sum of the voltage of the feedback signal and the voltage of the compensating signal, i.e., the voltage of the transforming signal is greater than the voltage of the feedback signal. Subsequently, the compare circuit 122 compares the voltage of the transforming signal outputted by the transformation circuit 121 with the voltage of the sharing signal and accordingly outputs the adjusting signal, thereby reducing the output power. When the output power is stable, the voltage of the transforming signal is equal to the voltage of the sharing signal.

A power supply method according to the first embodiment of the present invention could be executed by using the aforementioned power supply system 100. The power supply method includes the following steps as shown in FIG. 4:

Step S11: the control device 20 obtains the maximum power of each of the two power supply devices 10 from the two power supply devices 10.

In the current embodiment, the microprocessor 141 of each of the two signal processing modules 14 transmits the value of the maximum power of each of the two signal processing modules 14 stored in the microprocessor 141 to the control device 20 through the corresponding power management bus 30, so that the control device 20 could obtain the maximum power of each of the two power supply devices 10. Additionally, each of the two signal processing modules 14 could be electrically connected to an input detecting circuit (not shown) and an output detecting circuit (not shown). The input detecting circuit is electrically connected to the AC power source 3. The output detecting circuit is electrically connected to the output circuit 11. In this way, each of the two signal processing modules 14 could detect the input voltage information and the real-time value of the output power through the input detecting circuit and the output detecting circuit respectively, so that each of the two signal processing modules 14 could transmit the input voltage information and the real-time value of the output power to the control device 20.

For example, referring to the Table 1, it is assumed that the maximum power of the first power supply device 10A is 1200 W and the maximum power of the second power supply device 10B is 2000 W. A proportion corresponding to the output power of each of the two power supply devices 10, the voltage of the sharing signal, the output power of the first power supply device 10A, and the output power of the second power supply device 10B are listed in Table 1.

The proportion corresponding to the output power of each of the two power supply devices 10 with a grade of 10% is listed in Table 1. In practice, each grade of the proportion corresponding to the output power of each of the two power supply devices 10 could be less than 10%.

The first power supply device 10A and the second power supply device 10B respectively transmit the value of the corresponding maximum power to the control device 20. Because the compare module 12 of each of the two power supply devices 10 has not received the compensating signal, each of the two power supply devices 10 outputs the output power according to the voltage of the sharing signal and the voltage of the feedback signal received, i.e., each of the two power supply devices 10 outputs the output power according to a proportion corresponding to the voltage of the sharing signal, which is determined in relation to the maximum power rating of the corresponding power supply device 10. When the output power of each of the two power supply devices 10 is stable, the voltage of the feedback signal is equal to the voltage of the sharing signal. For example, when the voltage of the sharing signal is 4V, the output power of the first power supply device 10A is 600 W, the output power of the second power supply device 10B is 1000 W, and the voltage of the feedback signal is also 4V.

TABLE 1

| Data of the first power supply device 10A and the second power supply device 10B | | | | |
|---|---|---|---|---|
| Proportion corresponding to output power | Sharing signal (V) | Output power of first power supply device (W) | Output power of second power supply device (W) | Output power of second power supply device being adjusted (W) |
| 10% | 0.8 | 120 | 200 | 120 |
| 20% | 1.6 | 240 | 400 | 240 |
| 30% | 2.4 | 360 | 600 | 360 |
| 40% | 3.2 | 480 | 800 | 480 |
| 50% | 4 | 600 | 1000 | 600 |
| 60% | 4.8 | 720 | 1200 | 720 |
| 70% | 5.6 | 840 | 1400 | 840 |
| 80% | 6.4 | 960 | 1600 | 960 |
| 90% | 7.2 | 1080 | 1800 | 1080 |
| 100% | 8 | 1200 | 2000 | 1200 |

Step S12: when a controlling condition is met, the control device 20 outputs a controlling signal to one of the at least two power supply devices 10 with the greatest maximum power. The controlling condition includes a maximum power of the one of the at least two power supply devices 10 with the greatest maximum power is greater than a predetermined maximum power and is greater than a maximum power of another one of the at least two power supply devices. When the two power supply devices 10 does not meet the controlling condition, e.g., the maximum power of one of the two power supply devices 10 is the same as the maximum power of the other power supply device 10, the control device 20 does not output the controlling signal to any of the two power supply devices 10.

In the current embodiment, the control device 20 could be provided with the predetermined maximum power in advance. The predetermined maximum power could be set at 1000 W, which is an upper limit of safety regulations at the low line, but not limited thereto. The predetermined maximum power could be set upon the demand. When the control device 20 determines that the maximum power (2000 W) of the second power supply device 10B is greater than the predetermined maximum power (1000 W) and is greater than the maximum power (1200 W) of the first power supply device 10A, the control device 20 transmits the controlling signal to the second power supply device 10B through the corresponding power management bus 30. Because the maximum power of the first power supply device 10A is less than the maximum power of the second power supply device 10B, the control device 20 does not output the controlling signal to the first power supply device 10A.

In the current embodiment, the control device 20 could store the data of the first power supply device 10A and the second power supply device 10B listed in Table 1 and generate, according to the data of the first power supply device 10A and the second power supply device 10B listed in Table 1, a compensating voltage adapted to adjust the output power of the second power supply device 10B. For example, when the output power of the first power supply device 10A is 600 W and a voltage of the corresponding sharing signal is 4 V, the control device 20 calculates a difference between a voltage (4 V) of the sharing signal of the second power supply device 10B corresponding to the output power (1000 W) of the second power supply device 10B and a voltage (2.4 V) of the sharing signal of the second power supply device 10B corresponding to the output power (600 W) of the second power supply device 10B. At that time, the difference of the voltage of the sharing signal of the second power supply device 10B is 4 V–2.4 V=1.6 V, so that the control device 20 correspondingly generates the compensating voltage according to the difference (1.6 V) of the voltage of the sharing signal of the second power supply device 10B.

Step S13: the one of the at least two power supply devices 10 with the greatest maximum power adjusts the output power according to the controlling signal, so that the at least two output powers of the at least two power supply devices 10 are the same or similar.

In the current embodiment, after the microprocessor 141 of the signal processing module 14 of the second power supply device 10B receives the controlling signal, the microprocessor 141 of the signal processing module 14 of the second power supply device 10B controls the selection circuit 142 to generate the compensating signal according to the controlling signal, and the selection circuit 142 outputs the compensating signal to the transformation circuit 121 of the compare module 12. The transformation circuit 121 outputs the transforming signal to the compare circuit 122 according to the compensating signal and the feedback signal.

For example, the controlling signal outputted by the control device 20 contains the compensating voltage (e.g., 1.6 V); the microprocessor 141 controls the selection circuit 142 to generate the compensating signal according to the compensating voltage in the controlling signal; the voltage of the compensating signal is the compensating voltage. Because the output power of the second power supply device 10B is stable in step S11, the voltage of the feedback signal is equal to the voltage of the sharing signal (4 V) and the voltage of the transforming signal received by the transformation circuit 121 according to the voltage of the feedback signal and the voltage of the compensating signal is 5.6 V (i.e., 4 V+1.6 V).

The compare circuit 122 compares the voltage (5.6 V) outputted by the transformation circuit 121 with the voltage (4 V) of the sharing signal and accordingly outputs the corresponding adjusting signal to the output power adjustment module 13. Because the voltage outputted by the transformation circuit 121 is greater than the voltage of the sharing signal, the output power adjustment module 13 adjusts the output power outputted by the output circuit 11 according to the adjusting signal, thereby reducing the output power of the second power supply device 10B. In other words, the feedback signal of the second power supply device 10B correspondingly decreases, thereby reducing the voltage of the transforming signal outputted by the transformation circuit 121. Until the voltage of the transforming signal is equal to the voltage (4 V) of the sharing signal, the compare circuit 122 stops outputting the adjusting signal, so that the output power of the second power supply device 10B stays stable. At that time, the voltage of the feedback signal is 2.4 V and the output power of the second power supply device 10B is 600 W. In other words, when the voltage of the sharing signal is 4 V, the first power supply device 10A does not receive the controlling signal, so that the first power supply device 10A does not adjust the output power and directly outputs the output power (600 W); the second power supply device 10B receives the controlling signal and outputs the output power (600 W) after the adjustment. In this way, the purpose of making the two output powers of the two power supply devices 10 the same or similar could be achieved and a useful life of the one of the two power supply devices 10 with the greatest maximum power could be extended to enhance a reliability of the power supply system 100.

When the electric power demand of the load 1 is increased, the voltage of the sharing signal is raised and the two output powers of the two power supply devices 10 are raised at the same time, and the two output powers of the two power supply devices 10 remain the same or similar. On the contrary, when the electric power demand of the load 1 is decreased, the voltage of the sharing signal is reduced and the two output powers of the two power supply devices 10 are reduced at the same time, and the two output powers of the two power supply devices 10 remain the same or similar.

In the power supply method of the first embodiment, the input voltage of the AC power source 3 connected to the two power supply devices 10 could meet the high line or the low line.

For example, when the low line is met, the output power of the second power supply device 10B has been reduced. Therefore, when the output power of the second power supply device 10B after the adjustment has reached or approached the upper limit of the safety regulations, a total of the two output powers of the two power supply devices 10 could be 1920 W (960 W+960 W), so that a purpose of maximizing a total output power of the power supply system 100 could be achieved. If the output power of the second power supply device 10B is not adjusted, the total of the output powers of the two power supply devices 10 is 1600 W (600 W+1000 W).

In a second embodiment, the power supply system and the power supply method are provided with that the output power of the one of the at least two power supply devices 10 with the greatest maximum power could be better adjusted corresponding to the AC power source 3 meeting the low line. The input voltage of the AC power source 3 connected to the two power supply devices 10 meets the low line. In the second embodiment, the power supply system and the power supply method are almost the same as the power supply system of the first embodiment and the power supply method of the first embodiment, except that the controlling condition of the second embodiment is different from the controlling condition of the first embodiment. More specifically, the controlling condition of the second embodiment includes a first condition and a second condition.

the first condition: the input voltage information of the one of the at least two power supply devices 10 with the greatest maximum power meets the low line;

the second condition: the maximum power of the one of the at least two power supply devices 10 with the greatest maximum power is greater than the predetermined maximum power and is greater than the maximum power of another one of the at least two power supply devices 10.

In this way, when the input power in the power supply method of the second embodiment meets the low line, the purpose of maximizing the total output power of the power supply system could be also achieved.

Figure 5:
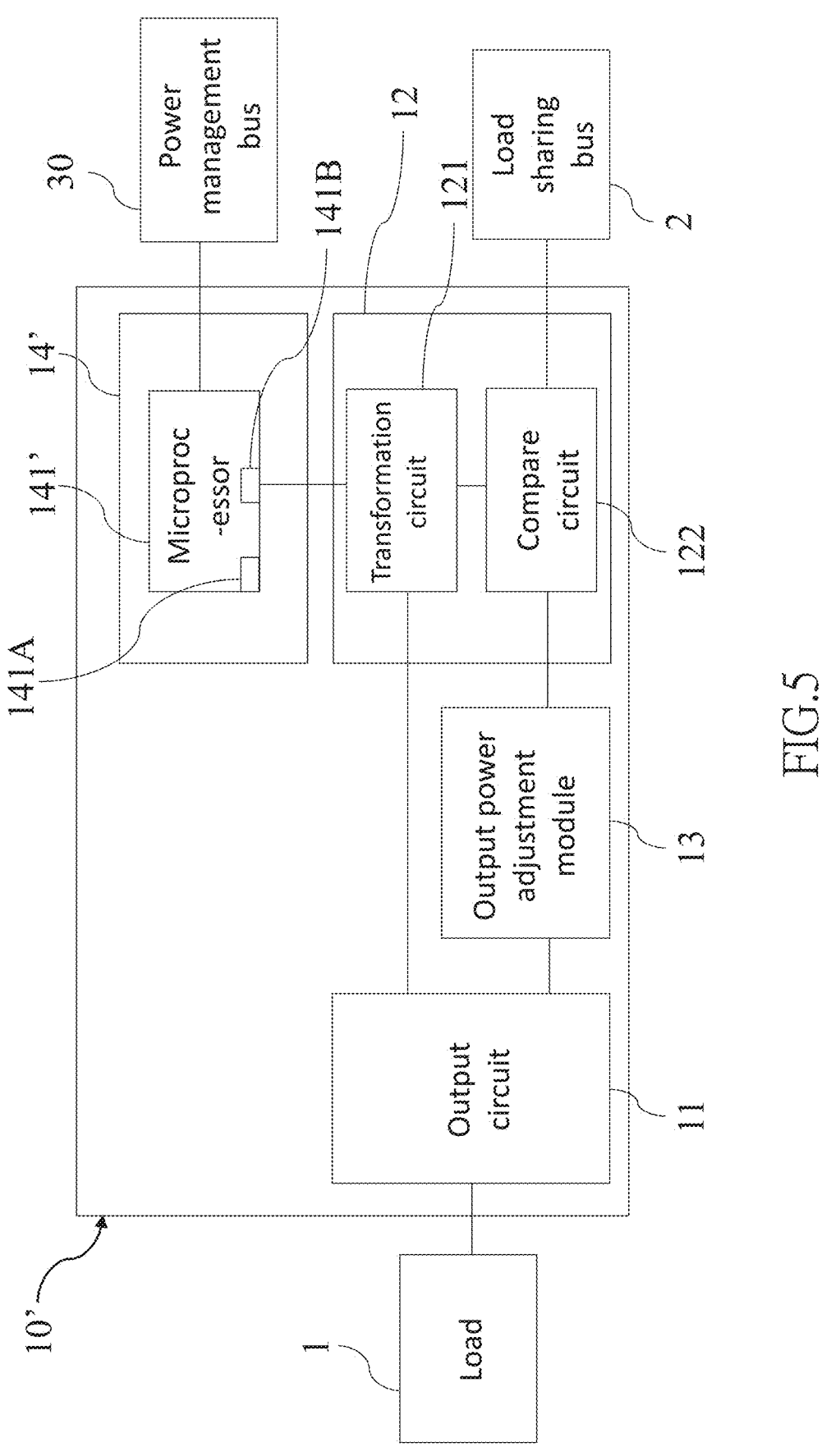
FIG. 5 is a schematic view of one of the at least two power supply devices according to a third embodiment of the present invention.

In a third embodiment, a power supply device 10' is illustrated in FIG. 5 and has a structure almost the same as the structure of the first embodiment, except that a microprocessor 141' of each of at least two signal processing modules 14' of the third embodiment could have an analog voltage output unit 141B. Different voltages are outputted by the microprocessor 141' to form the compensating signal. When the microprocessor 141' outputs 0 V, the compensating signal is not outputted. In this way, the signal processing module 14' of each of the at least two power supply devices 10' could be provided without the selection circuit 142; the microprocessor 141' could be directly and electrically connected to the transformation circuit 121. When the microprocessor 141' of the one of the at least two power supply devices 10' with the greatest maximum power receives the controlling signal, the microprocessor 141' outputs the compensating signal according to the controlling signal, so that a purpose of making the at least two output powers of the at least two power supply devices 10' the same or similar could be also achieved.

The power supply device 10' could be applied to the power supply method of the second embodiment.

Additionally, in the first embodiment and in the second embodiment, when the power supply system includes three power supply devices or more, the controlling condition of the first embodiment or the second condition of the controlling condition of the second embodiment would be that the maximum power of the one of the power supply devices with the greatest maximum power is greater than the predetermined maximum power and is greater than the maximum power of one of the power supply devices with the least maximum power. Additionally, the controlling signal would be outputted to the one of the power supply devices with the greatest maximum power, so that the one of the power supply devices with the greatest maximum power adjusts the output power. In this way, the output power of the one of the power supply devices with the greatest maximum power is the same as or similar to the output power of the one of the power supply devices with the least maximum power.

It must be pointed out that the embodiments described above are only some preferred embodiments of the present invention. All equivalent structures which employ the concepts disclosed in this specification and the appended claims should fall within the scope of the present invention.

What is claimed is:

1. A power supply system adapted to supply a power to a load and connected to a load sharing bus, comprising:

at least two power supply devices connected in parallel to the load, wherein each of the at least two power supply devices has a maximum power and outputs an output power to the load; the maximum power of each of the at least two power supply devices is the greatest rated output power of each of the at least two power supply devices; the output power of each of the at least two power supply devices is less than or equal to the maximum power of each of the at least two power supply devices; each of the at least two power supply devices receives a sharing signal from the load sharing bus and adjusts the output power of each of the at least two power supply devices according to the sharing signal; the sharing signal corresponds to a proportion of the output power of each of the at least two power supply devices relative to its own maximum power;

a control device electrically connected to the at least two power supply devices, wherein the control device obtains the maximum power of each of the at least two power supply devices from each of the at least two power supply devices; when a controlling condition is met, the control device outputs a controlling signal to one of the at least two power supply devices with the greatest maximum power and the one of the at least two power supply devices with the greatest maximum power accordingly adjusts the corresponding output power, so that the at least two output powers of the at least two power supply devices are the same or similar;

wherein the controlling condition comprises: the maximum power of the one of the at least two power supply devices with the greatest maximum power is greater than a predetermined maximum power and is greater than the maximum power of another one of the at least two power supply devices.

2. The power supply system as claimed in claim 1, wherein the at least two power supply devices are electrically connected to an AC power source; each of the at least two power supply devices transmits an input voltage information corresponding to the AC power source to the control device;

wherein the controlling condition further comprises that the input voltage information of the one of the at least two power supply devices with the greatest maximum power meets a low line.

3. The power supply system as claimed in claim 1, wherein each of the at least two power supply devices comprises an output circuit, a compare module, an output power adjustment module, and a signal processing module; the output circuit is electrically connected to the load and outputs a feedback signal; the compare module is electrically connected to the load sharing bus, the output circuit, and the output power adjustment module; the signal processing module is electrically connected to the control device and the compare module; the compare module outputs an adjusting signal to the output power adjustment module according to the sharing signal and the feedback signal for adjusting the output power; when the signal processing module of the one of the at least two power supply devices with the greatest maximum power receives the controlling signal, the signal processing module outputs a compensating signal to the compare module, and the compare module outputs the adjusting signal to the output power adjustment module according to the sharing signal, the feedback signal, and the compensating signal.

4. The power supply system as claimed in claim 3, wherein the compare module of each of the at least two power supply devices comprises a transformation circuit and a compare circuit; the transformation circuit receives the feedback signal and outputs the feedback signal to the compare circuit; the compare circuit outputs the adjusting signal according to the feedback signal and the sharing signal; when the signal processing module of the one of the at least two power supply devices with the greatest maximum power outputs the compensating signal, the corresponding transformation circuit receives the compensating signal and outputs a transforming signal to the compare circuit according to the compensating signal and the feedback signal and the compare circuit outputs the adjusting signal according to the transforming signal and the sharing signal.

5. The power supply system as claimed in claim 4, wherein the signal processing module of each of the at least two power supply devices comprises a microprocessor and a selection circuit; the microprocessor is electrically connected to the control device and the selection circuit; the selection circuit is electrically connected to the transformation circuit; when the microprocessor of the one of the at least two power supply devices with the greatest maximum power receives the controlling signal, the microprocessor controls the selection circuit to output the compensating signal according to the controlling signal.

6. The power supply system as claimed in claim 4, wherein the signal processing module of each of the at least two power supply devices comprises a microprocessor; the microprocessor is electrically connected to the transformation circuit; when the microprocessor of the one of the at least two power supply devices with the greatest maximum power receives the controlling signal, the microprocessor outputs the compensating signal according to the controlling signal.

7. A power supply method applied to a power supply system, wherein the power supply system comprises at least two power supply devices and a control device; the at least two power supply devices are connected in parallel to a load; each of the at least two power supply devices has a maximum power and outputs an output power to the load; the maximum power of each of the at least two power supply devices is the greatest rated output power of each of the at least two power supply devices; the output power is less than or equal to the maximum power; each of the at least two power supply devices receives a sharing signal from a load sharing bus and adjusts the corresponding output power according to the sharing signal; the sharing signal corresponds to a proportion of the output power of each of the at least two power supply devices relative to its own maximum power; the power supply method comprises the following steps:

obtaining, by the control device, the maximum power of each of the at least two power supply devices from each of the at least two power supply devices;

outputting, by the control device, a controlling signal to one of the at least two power supply devices with the greatest maximum power when a controlling condition is met, wherein the controlling condition comprises that the maximum power of the one of the at least two power supply devices with the greatest maximum power is greater than a predetermined maximum power and is greater than the maximum power of another one of the at least two power supply devices;

adjusting, by the one of the at least two power supply devices with the greatest maximum power, the corresponding output power according to the controlling signal, so that the at least two output powers of the at least two power supply devices are the same or similar.

8. The power supply method as claimed in claim 7, wherein the at least two power supply devices are electrically connected to an AC power source; the power supply method further comprises: transmitting, by each of the at least two power supply devices, an input voltage information corresponding to the AC power source to the control device;

wherein the controlling condition further comprise: the input voltage information of the one of the at least two power supply devices with the greatest maximum power meets a low line.

* * * * *